United States Patent [19]

Coughlin

[11] 3,894,432
[45] July 15, 1975

[54] COMBINATION METERED WATER SERVICE INSTALLATION UNIT

[76] Inventor: Donald W. Coughlin, P.O. Box 2025, San Bernardino, Calif.

[22] Filed: Dec. 20, 1973

[21] Appl. No.: 426,442

[52] U.S. Cl. ................ 73/201; 210/136; 210/411; 210/432
[51] Int. Cl.² ........................................ G01F 15/10
[58] Field of Search ....... 210/97, 99, 100, 105, 106, 210/108, 109, 110, 130, 134, 135, 407, 136, 411, 432; 137/98, 269, 271, 459, 486, 460, 494, 608, 613, 625; 73/198, 200, 201, 273

[56] References Cited
UNITED STATES PATENTS

| | | | |
|---|---|---|---|
| 691,904 | 1/1902 | Hallbergh | 73/198 |
| 796,252 | 8/1905 | Tollinger | 137/625.15 |
| 1,130,792 | 3/1915 | Burton | 73/200 |
| 2,781,056 | 2/1957 | Carutel | 137/625.15 X |
| 2,797,707 | 7/1957 | Hursh | 137/625.15 X |
| 3,072,136 | 1/1963 | Roos | 137/625.15 X |
| 3,083,693 | 4/1963 | Kunz | 137/625.46 |
| 3,262,464 | 7/1966 | Frantz | 137/613 X |
| 3,443,436 | 5/1969 | Meyer | 73/273 |
| 3,485,371 | 12/1969 | Costantini | 210/135 |
| 3,756,275 | 9/1973 | Barrera | 137/544 |

FOREIGN PATENTS OR APPLICATIONS

| | | | |
|---|---|---|---|
| 863,148 | 3/1941 | France | 73/198 |

Primary Examiner—Theodore A. Granger
Attorney, Agent, or Firm—Dana E. Keech

[57] ABSTRACT

A common integral housing provides three contiguously juxtaposed vertical shells providing three cylindrical chambers connected sequentially by two passages, the middle chamber providing a sealed accommodation for a water meter to effect sealed communication respectively between the inlet and outlet terminals of said meter with said chamber connecting passages. The end chambers form the bores of inlet and outlet plug valves which connect, in opposite directions from said passages, with threaded main line and customer service line connections respectively.

The inlet plug valve incorporates a strainer within the plug thereof, rotation of said plug to various settings optionally producing the following functions: (a) facilitating direct flow of water from the main line through the strainer and the inlet passage to the meter chamber; (b) backflushing said strainer to waste while shutting off water flow to meter; and (c) shutting off the main line connection with the valve but opening communication of the valve with the meter and with the waste connection thereby draining the valve and meter to waste so as to prevent freezing during seasonal winter disconnection of water service.

The outlet plug valve incorporates two tandem check valves within the plug, said valves connecting said meter outlet passage with said service outlet connection when said valve is opened while giving double protection against a flow in the reverse direction. The closing of said outlet valve shuts both said meter outlet passage and said service outlet connection and individually opens to drainage the three spaces into which the interior of said plug is divided by said tandem check valves.

1 Claim, 14 Drawing Figures

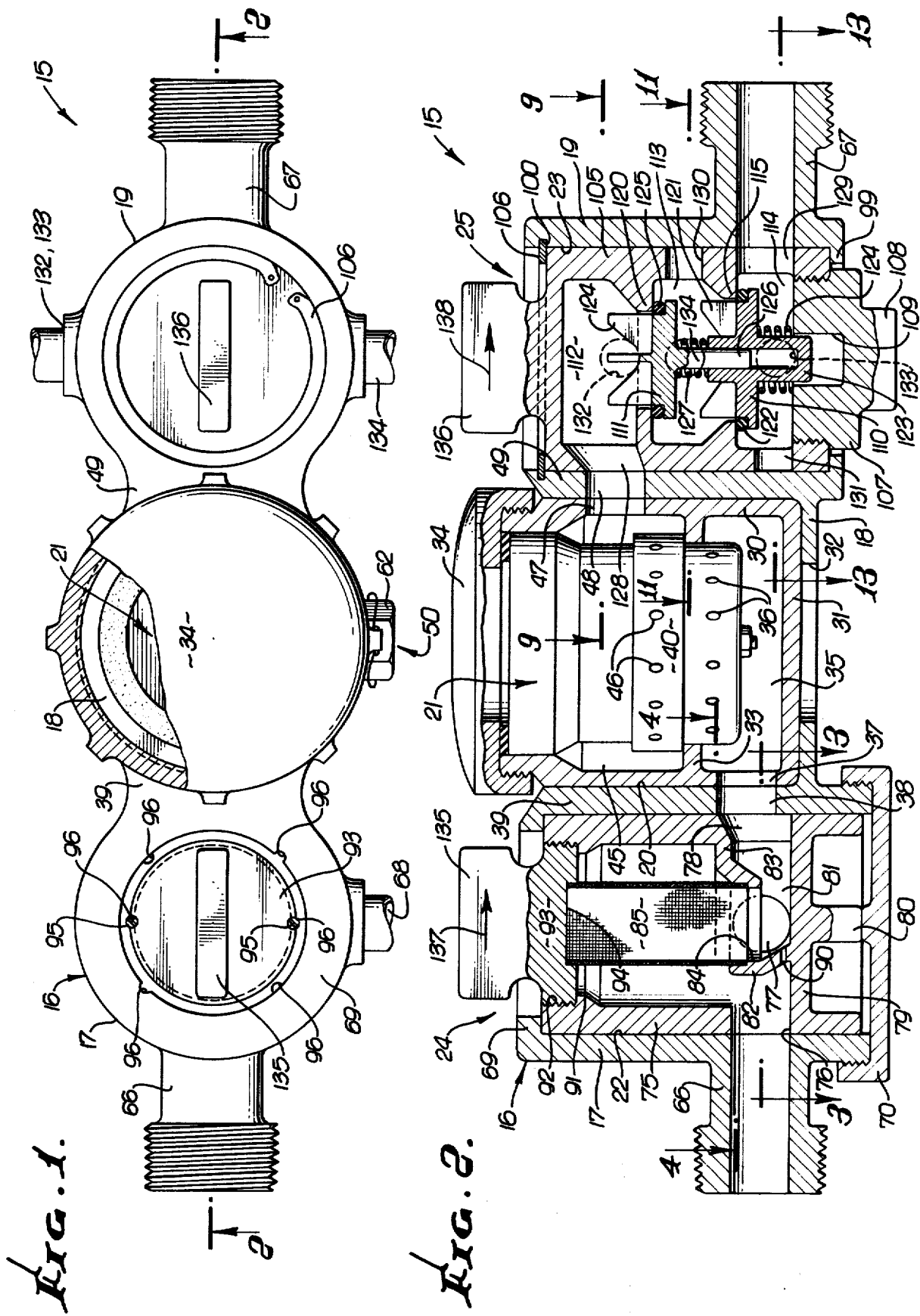

COMBINATION METERED WATER SERVICE INSTALLATION UNIT

SUMMARY OF THE INVENTION

Heretofore where the Plumbing Code has required the installation of a strainer or a check valve or a shut-off valve or a drain valve in association with a water meter at the location where a main water line lateral delivers water to a customer service connection, these separate components generally had to be assembled on the job by conventional pipe fittings. This entailed a considerable amount of labor in assembling the work on the job, solely for which a not inconsiderable amount of space had to be provided on the job.

It is a primary object of the present invention to provide a prefabricated unit incorporating a water meter and inlet and outlet plug valves controlling the inlet and outlet connections of said meter.

Another object is to provide such a unit in which the plug of said inlet valve incorporates a screen through which said water flows to said meter, when said valve is open, and, through which screen, water from the main line reversely flows to waste when said valve is turned to shut the passage to said meter.

Still another object of the invention is to provide such a unit in which said plug of the inlet valve has a shut-off position in which communication with the main line is shut off, communication with the meter inlet passage is opened and a drain connection is opened permitting water to drain to waste from both said valve and said meter.

A further object of the invention is to provide such a prefabricated unit in which the plug of the outlet valve incorporates a check valve which permits a flow of water from the outlet of said meter to said outlet service connection of said unit when said outlet valve is turned on but prevents a reverse flow of water through said outlet valve at any time.

A yet further object of the invention is to provide such a unit wherein said outlet valve, in shut-off position, shuts off both the outlet of the water meter and the outlet connection of the unit and opens the interior space of the plug of said outlet valve to drain water therefrom.

Another object is to provide such a unit wherein the plug of said outlet valve is provided with two tandem check valves which divide the interior cavity within said plug into three portions, said plug, in shut-off position, shutting off both the meter outlet and the unit service connection and opening said cavity portions individually to drainage.

BRIEF DESCRIPTION OF THE DRAWINGS

FIG. 1 is a diagrammatic plan view of a preferred embodiment of the invention.

FIG. 2 is a longitudinal vertical sectional view taken on line 2—2 of FIG. 1.

FIGS. 1, 2, 3 and 4 showing the inlet valve plug in open position, delivering strained water to the meter; FIGS. 1 and 2 also showing the outlet valve plug in open position delivering measured water to the service outlet connection of the unit.

DETAILED DESCRIPTION OF THE PREFERRED EMBODIMENT

Figure 3:
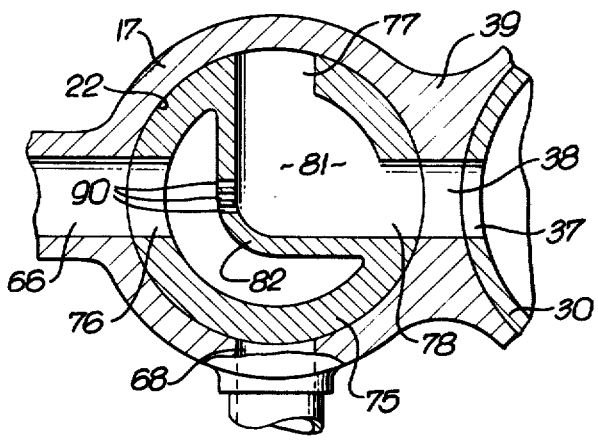
FIG. 3 is a fragmentary detail horizontal sectional view taken on line 3—3 of FIG. 2.

The combination metered water service installation unit 15 of the invention includes an integrally cast housing 16 which provides three contingently juxtaposed vertical cylindrical shells 17, 18 and 19, the middle shell 18 of which provides a cylindrical chamber 20 for a water meter 21, while the outer shells 17 and 19 are contiguous with shell 18 and extend in opposite directions therefrom to provide cylindrical chambers 22 and 23 respectively of shut-off inlet plug drain valve 24 and shut-off outlet plug check valve 25.

The shell 18 is provided with internal dimensions allowing the same to accommodate water meters 21 varying as much as ⅛ inch in one or more of their external dimensions, such as outside diameter and/or length. To permit unit 15 to be so used, it is provided with several adapter sleeves 30, the external dimensions of all of which are alike so that each of these adapter sleeves may make a smooth sealing fit with the interior of chamber 20. The internal dimensions of the adapter sleeves 30 vary slightly so that each one of these sleeves will snugly receive therein any of that group of meters 21 it is made to fit. The adapter sleeves 30 are preferably injection molded from hard plastic material so that it is not costly to keep a variety of the sleeves 30 in inventory, thereby enabling use of the unit 15 with a substantial range of commercially available meters 21.

Each adapter sleeve 30 has an integral bottom 31 which overlies a hole 32 in the bottom of cylindrical shell 18 and the adapter also has an internal annular flange 33 about one-third the way up from said bottom 31. The upper end portion of sleeve 30 is slightly restricted in diameter and externally threaded to receive a cap 34 for closing the upper end of the sleeve and retaining a meter 21 locked therein and resting downwardly on flange 33. When a meter 21 is thus inserted into and confined in an adapter sleeve 30 made to fit said meter, a water inlet space 35 is thus enclosed in the lower end of the sleeve 30, said space communicating with water receiving ducts 36 provided in the lower end portion of meter 20 for delivering water to be metered to said meter. The sleeve 30 has a water inlet port 37 which connects with a passage 38 formed in a wall 39 of the housing 16 which is common to the two shells 17 and 18. Contact between the annular flange 33 and an enlarged middle portion 40 of the meter 21 also confines an annular space 45 in the upper portion of adapter sleeve 30 which receives metered water through ducts 46 provided in said middle portion 40 of meter 21. Escape of said metered water is provided for through a water outlet port 47 formed in an upper portion of sleeve 30 in offset diammetrically opposite relation with sleeve inlet port 37. The port 47 connects directly with a passage 48 formed in a wall 49 of the housing 16 which is common to the two shells 18 and 19.

Figure 8:
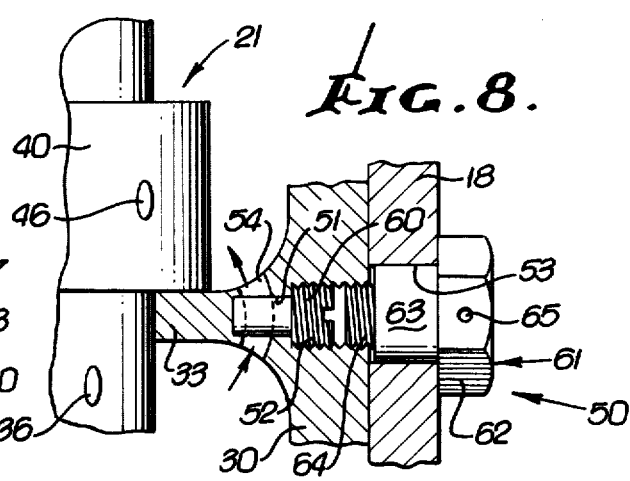
FIG. 8 is a fragmentary vertical sectional view taken on the line 8—8 of FIG. 1 and illustrates the locking seal preventing unauthorized removal of the meter from the unit of the invention.
Figure 9:
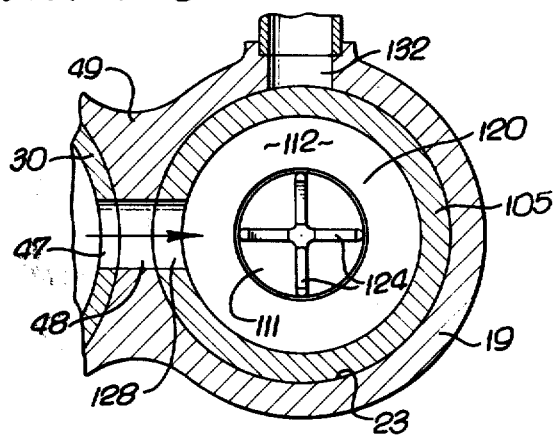
FIG. 9 is a diagrammatic fragmentary horizontal sectional view taken on line 9—9 of FIG. 2 showing the outlet valve of the invention in open position.

Referring to FIG. 8, a meter by-passing and locking device 50 is here illustrated to prevent unauthorized tampering with the meter 21. The device 50 is located approximately on the level of the internal annular flange 33 formed inwardly from the adapter sleeve 30, and includes a blind bore 51 having a tapped counter bore 52 and formed horizontally inwardly from the outer face of the adapter sleeve 30. Formed in the wall of the cylinder 18 so as to be matchable co-axially with the blind bore 51 is a larger hole 53. An arcuate approximately vertical hole 54 penetrates the annular flange 33 and also intercepts an inner end portion of the blind bore 51. A pin 55 fitting the blind bore 51 and having a threaded head 60 which fits the tapped counter bore 52 is adjustably insertable into the bore 51 and counter bore 52 for a purpose to be made clear hereinafter. Said pin is adapted to be trapped in said adjustable position in said blind bore by a plug and lock screw 61 having a hex head 62 and a smooth shank 63 which fits and just fills the hole 53. Shank 63 has a threaded nipple 64 on its inner end which can be screwed into tapped counter bore 52 to unite the adapter sleeve 30 and shell 18 in properly oriented assembled relation and to prevent unauthorized access to the meter 21. A sealing wire hole 65 is formed crosswise in the hex head 62 for use in the conventional method of sealing the unit 15 against unauthorized tampering with the meter 21.

Formed co-axially and integrally with the unit housing 16 to extend in opposite directions from the shells 17 and 19 therof are inlet water connection 66 and outlet water connection 67. Formed in the shell 17 on the same level as inlet connection 66 and at right angles therewith is a drain connection 68.

The chamber 22 of shell 17 has a short inturned annular lip 69 at its upper end and is open at its lower end. The lower end of shell 17 extends a short distance below the lower end of shell 18 and is externally threaded to receive a cap 70. Trapped within chamber 22 between inturned lip 69 and cap 70 is a hollow valve plug 75. This plug has three main water ports 76, 77 and 78 which are located on the same level as inlet connection 66 and are spaced apart at 90° intervals, the ports 76 and 78 being diametrically opposite from each other. Just below the level of said ports, plug 75 has a floor 79 having a central stud 80, the lower end of which rests on the cap 70. Ports 77 and 78 are connected by a cavity 81 located just above the floor 79 and separated from the rest of the space within the valve plug 75 by a vertical angle wall 82 and a sub-floor 83, the latter having formed therein co-axially with the plug 75 a counter bored aperture 84 for receiving the lower end of a cylindrical screen 85. One or more small diameter drain holes 90 are drilled in the angle wall 82 close above the floor 79.

The upper end of valve plug 75 is restricted slightly in internal diameter to provide an annular shoulder 91 located at the bottom of a threaded counter bore 92. A wrench head 93 screws downwardly into the counter bore 92 so as to be flush with the upper end of the plug 75, said wrench head being provided with a central recess 94 in its bottom end for fitting over and capturing the screen 85 in assembled relation with the plug 75.

As shown in FIG. 1, screw keys 95 have suitable tapped holes 96 provided for receiving the same in the upper end of valve plug 75, certain of said holes overlapping the pitch line of tapped counter core 92 and the others overlapping the inner edge of inturned lip 69 so that by shifting screws 95 selectively from one set of threaded holes 96 to the other, the wrench head 93 may be locked to the valve plug 75 or removed from the latter after locking the latter relative to housing shell 17.

Housing shell 19 extends a slight distance below the lower end of housing shell 18 and has an inturned annular lip 99 at its lower end. The chamber 23 provided in said shell opens upwardly and has an annular internal slot 100 provided just below its upper end. The shut-off plug check valve 25 of the invention includes a hollow valve plug 105 which rotatably fits within chamber 23 of shell 19 between internal lip 99 and internal slot 100 and is confined in said chamber by an expansible spring ring 106 when the latter is allowed to expand into said slot. The hollow interior of valve plug 105 is closed at its lower end by a threaded plug 107 which screws into a suitable tapped bore provided therefor in the lower end of said valve plug 105. The plug 107 has a suitable wrench head 108 formed outwardly thereon and a blind axial hole 109 is formed downwardly from the upper face of said plug. Provided co-axially within valve plug 105 are two tandem check valves 110 and 111 which divide the interior space within hollow valve plug 105 into upper, middle and lower cavities 112, 113 and 114. The two check valves are provided respectively with lower and upper valve seats 115 and 120, the lower being of substantially greater diameter than the upper valve seat. Lower check valve 110 has vanes 121 for guiding the same vertically relative to valve seat 115 and has an annular recess for mounting an O-ring 122 for closing valve seat 115 when valve 110 is shifted upwardly. Lower check valve 110 has a hollow stem 123 which extends both upwardly from and below the valve and is closed at its lower end and open at its upper end. The hollow stem 123 slideably fits within the axial hole 109 in plug 107 so as to be guided thereby. A light coil spring 124 surrounding the stem 123 between threaded plug 107 and lower check valve 110 yieldably urges said valve into closed position with a very light force which will be readily overcome by the pressure normally existing in water flowing through the unit 15 of the invention.

In a like manner, upper check valve 111 has vanes 124 for guiding the valve vertically relative to upper valve seat 120 and is recessed to mount an O-ring 125 which is normally yieldably pressed upwardly by said valve against valve seat 120. The upper valve 111 has a solid stem 126 which slideably extends into the hollow stem 123 of check valve 110 and upper valve 111 is biased upwardly relative to lower check valve 110 by a coil spring 127 which is coiled about stem 126 between valve 111 and hollow stem 123.

Valve plug 105 has main inlet and outlet ports 128 and 129 provided at upper and lower ends of the plug for communication respectively with main housing passage 48 and service outlet connection 67. Each of the cavities 113 and 114 have special drain ports 130 and 131. Shell 19 has provided therein and extending rearwardly therefrom and on the same level as ports 128 and 131, drain conduits 132 and 133 for alignment with ports 128 and 131 respectively when the valve 25 is shut off. In like manner, shell 19 has provided on its front side a drain conduit 134 which is brought into alignment with drain port 130 when valve 25 is in shut-off position.

OPERATION

For assistance in orienting the valve plugs 75 and 105 respectively of the valves 24 and 25, the wrench keys 135 and 136 of these valve plugs are provided in FIG. 2 with arrows 137 and 138. When the keys 135 and 136 are aligned as shown in FIGS. 1 and 2 with the arrows 137 and 138 pointing as shown in the latter figure, the unit 15 is entirely turned on for normal operation in which water delivered from a main line lateral to the inlet connection 66 of unit 15 passes entirely through the unit and is discharged from the outlet connection 67 into the customer's service line. In its flow through the unit, this water passes from the inlet connection 66 through port 76 into the space within the valve plug 75 which surrounds the screen 85 and readily passes through the screen, this screen separating from the water any solid matter larger than the fine mesh of the screen. The water then flows downwardly through the vertical bore 84 formed in sub-floor 83 into the cavity 81 and out through valve plug port 78 into unit housing passage 38 and through inlet port 37 of the meter adapter sleeve 30 into the water inlet space 35 in the lower end of said sleeve. From this space the water enters the meter 21 through inlet ducts 36, is measured by said meter and discharged from the latter through the outlet ducts 46 and, from the annular upper space 45 in sleeve 30, flows through water outlet port 47 in sleeve 30 and housing unit passage 48 and main check valve inlet port 128 into the upper cavity 112 of check valve plug 105. At this point the two check valves 110 and 111 readily yield to the downward pressure of the water thereagainst to open and allow free flow of the water from the upper cavity 112 through the middle cavity 113 and into the lower cavity 114 of check valve 25 from which the water is discharged through the main check valve outlet port 129 into the outlet water connection 67.

Figure 4:
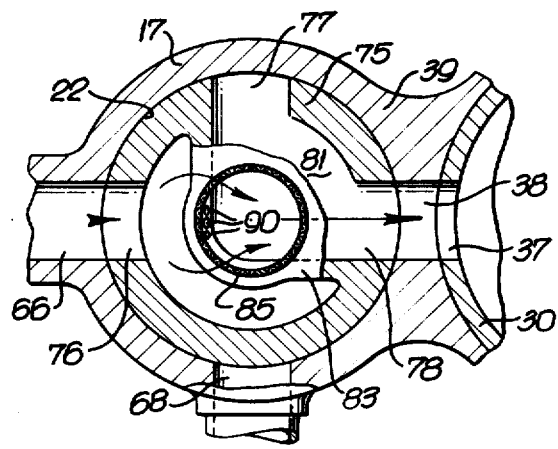
FIG. 4 is a similar view taken on line 4—4 of FIG. 2.
Figure 5:
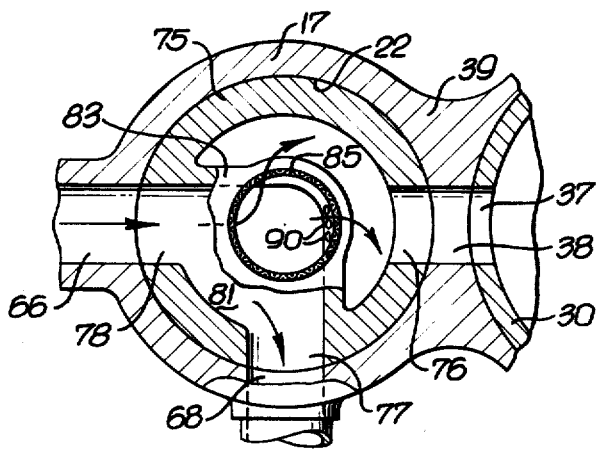
FIG. 5 is a view similar to FIG. 4 with the inlet valve plug turned 180° from the position in which it is shown in FIG. 4.
Figure 6:
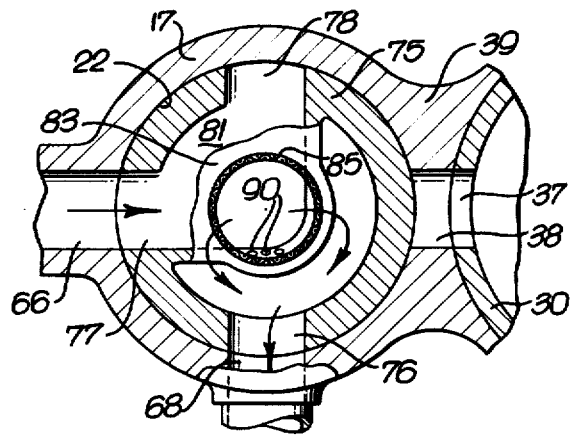
FIG. 6 is a view similar to FIG. 4 with the inlet valve plug turned clockwise 270° from the position in which it is shown in FIG. 4.

Referring now to FIGS. 4 to 7 inclusive, it is to be noted that FIG. 4 illustrates the flow of water through the shut-off plug drain valve 24 when both valves 24 and 25 are turned on as shown in FIG. 2. In the normal operation of the unit 15 over a period of several months the mount of material in suspension in the water flowing into the unit and removed therefrom by the screen 85 will accumulate outside of cavity 81 on the floor 79 and sub-floor 83 of the hollow valve plug 75. At the same time this is taking place, fibrous particles suspended in the incoming water tend to collect on the outer face of the screen 85 and impair the capacity of said screen to transmit water flowing through the unit 15. To back flush both the solid particles and fibrous particles thus accumulated in valve plug 75, the key wrench 135 is rotated 90° counterclockwise as illustrated in FIG. 6 and allowed to remain in this position for a few minutes before returning it to its normal turned-on position shown in FIGS. 1, 2, 3 and 4.

During the period that the valve plug 75 is positioned as shown in FIG. 6, the main unit housing passage 38 is closed, the port 76 is in communication with the waste opening 68 and the port 77 is in communication with the inlet connection 66. With the valve plug 75 positioned as shown in FIG. 6 therrefore, water flows from the inlet connection 66 through the valve plug port 77 into the space 81 confined by the angle wall 82 and sub-floor 83, then upwardly through the counter bored aperture 84 and into the screen 85 so that the water pressure of the main line is applied from inside the screen 85 to back flush from the outer surface of said screen any fibrous particles adhering thereto and drive such particles together with any solid particles collected in the lower portion of the valve plug 75 outwardly through port 76 into the drain connection 68 which conducts the back flushing water and the particles carried thereby to waste.

The valve 24 has an optional mode of operation for flushing the screen 85 which is illustrated in FIG. 5. This mode of flushing the screen is accomplished by rotating the valve plug 75 180° in either direction from its normal turned-on position shown in FIGS. 1 and 2. When this is done and the valve plug 75 is positioned as shown in FIG. 5, the port 76 is in communication with the main housing passage 38 leading to the meter 21 while valve plug port 77 is in communication with drain connection 78 and valve plug port 78 is in communication with the main inlet connection 66 of the unit. With the valve plug 75 disposed as shown in FIG. 5, therefore, the water flows from the main line through inlet connection 66 and valve plug port 78 into the cavity 81 of the valve plug 75 beneath the sub-floor 83 and upwardly through the aperture 84 into the screen 85 and thus back flushes the screen to the drain opening 68. The only objection to using the method illustrated in FIG. 5 is that during this back flushing operation the communication through the port 76 and the passage 38 to the interior of the meter confining sleeve 30 allows for the possibility of a certain amount of the accumulated solid matter and fibrous matter being flushed from the valve plug 75 to gain admittance to the water inlet space 35 in the lower end of the adapter sleeve 30 thus contaminating the water supply to the meter 21. Such contamination would be substantially prevented however, in case during the back flushing operation illustrated in FIG. 5 the check valve 25 were to be turned off by the wrench key 136 of this valve being rotated 90° in either direction. Normal operation of the unit 15, therefore, contemplates back flushing of the valve 24 in accordance with the method illustrated in FIG. 6 instead of that illustrated in FIG. 5.

Figure 7:
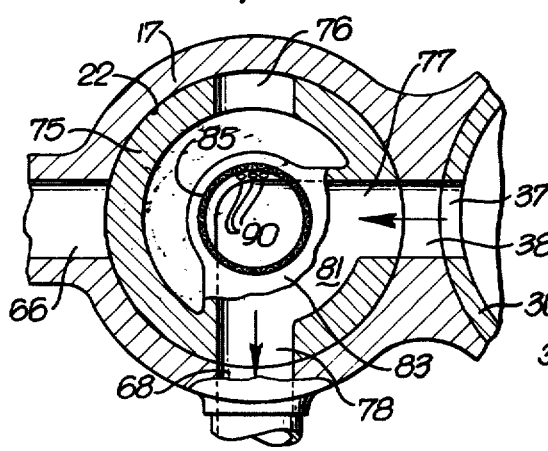
FIG. 7 is a view similar to FIG. 4 with the inlet valve plug turned clockwise 90° from the position in which it is shown in FIG. 4, thus shutting off the main inlet connection and opening the inlet valve and meter to drain to waste.

The unit 15 of the invention has the additional merit of providing a facility for shutting off the connection of the unit with the main line supplying water thereto and at the same time provide for the meter 21 and valve 24 being drained of residual water during the shutting down of the service supplied through unit 15 to a particular customer as when, during a winter period, such service is not desired. The aforementioned facility is placed in operation by rotating the plug 75 of valve 24 90° in clockwise direction as shown in FIG. 7. When this is done, the inlet connection 66 is shut off by the presentation thereto of an imperforate area of the valve plug 75 while at the same time placing the port 77 of said plug in communication with passage 38 and placing the port 78 of said plug in communication with the drain connection 68. When the inlet connection 66 is thus shut off for the winter season, it is preferable that the check valve 25 also be turned to shut-off position by rotating the valve plug 105 thereof 90° in a clockwise direction. This presents imperforate areas of the plug 105 simultaneously to the main outlet connection 67 of the unit and to the inter shell passage 48 of the housing 16 of the unit.

Figure 10:
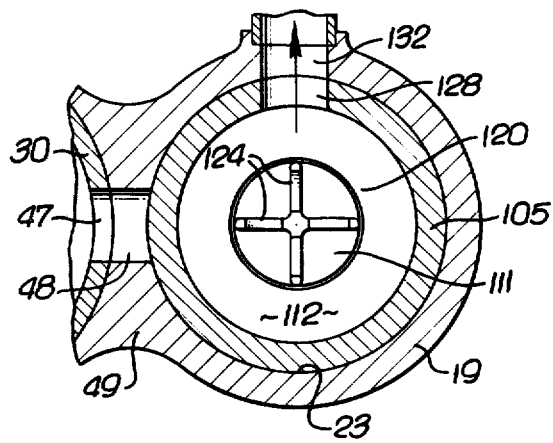
FIG. 10 is a view similar to FIG. 9 with the outlet valve in shut-off-but-drain position.
Figure 11:
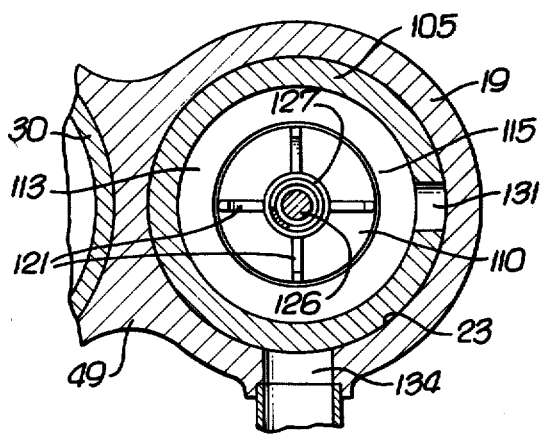
FIG. 11 is a sectional view taken on line 11 of FIG. 2 with the outlet valve shown in open position.
Figure 12:
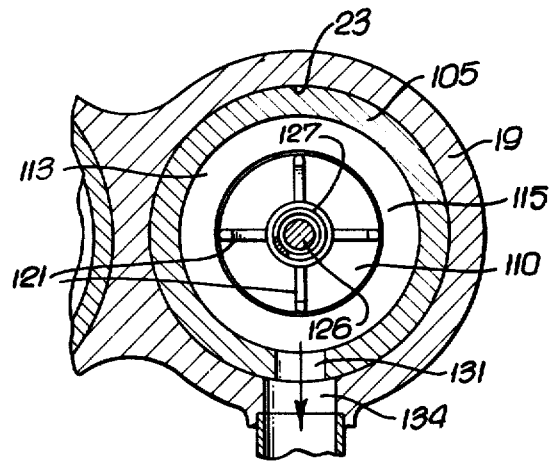
FIG. 12 is a view similar to FIG. 11 with said outlet valve shown in shut-off-but-drain position.
Figure 13:
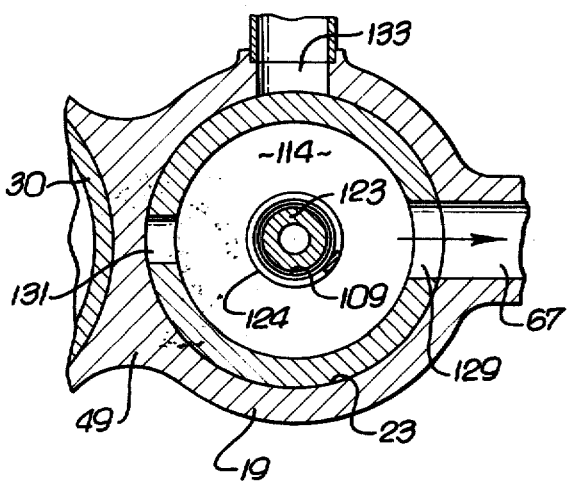
FIG. 13 is a sectional view taken on line 13—13 of FIG. 2 with said outlet valve shown in open position.
Figure 14:
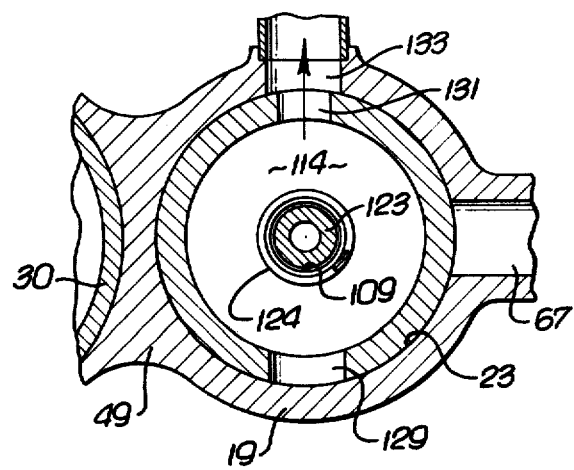
FIG. 14 is a sectional view similar to FIG. 13 with said outlet valve shown in shut-off-but-drain position.

As shown in FIGS. 10, 12 and 14 such a setting of the valve plug 105 in shut-off position results in main check valve inlet port 128 being aligned with housing drain conduit 132, with special drain port 130 being aligned with drain conduit 134, and with special drain port 131 being aligned with drain conduit 133. The shutting off of valve 25 in the maner indicated, thus not only closes the outlet connection 67 of the unit 15 and the inter shell passage 48 of the housing 16, but it also provides drainage to waste from each of the three cavities 112, 113 and 114 of the valve plug 105 of check valve 25 thereby protecting this valve against damage by freezing while the unit 15 is shut down during the winter.

Referring now to FIG. 8, it is desired to point out that the hole 54 formed in internal annular flange 33 of the adapter sleeve 30 and which intercepts an inner end of the blind bore 51 employed in the locking device 50, is for the purpose of cooperating with the pin 55 to form a regulated by-pass for water through the flange 33 which is necessary to assure accuracy in the measurement by the meter 21 of water flowing therethrough. Variation in the accuracy of the meter 21 renders this device necessary.

From the foregoing disclosure of the preferred embodiment 15 of the present invention, it is manifest that the latter provides in one package a unit which will perform within itself all the services of introducing a meter between the main water line and the customer service line, of straining suspended solid matter and fibrous matter from the water received from the main line before the water flows through the meter, that will facilitate the back flushing of the screen at suitable intervals without requiring disassembly of the unit in any way and that will provide double protection against a back flow of water to the main line from the customer's service piping system, and finally, a unit which has within itself the means for readily shutting off connections between the unit and the main line and between the unit and the customer's service piping system while the unit is shut down during the winter season and which in so shutting down the unit automatically provides for all residual water in the unit being drained therefrom so as to prevent any damage thereto by icing.

I claim:

1. A combination metered water service installation unit comprising:

a common integral housing providing three contiguously juxtaposed vertical shells, the terminal shells providing primary and secondary valve chambers and the inner shell providing a generally cylindrical meter-enclosing chamber having an internal annular flange spaced upwardly from the bottom of said inner shell;

said inner shell sharing a common wall with each of said terminal shells, one of said common walls having a primary flow passage connecting said meter chamber below said flange with a lower portion of said primary valve chamber, the other of said common walls having a secondary flow passage connecting said meter chamber above said flange with said secondary valve chamber;

a generally cylindrical meter occupying said meter chamber and resting on said internal flange, said meter having openings above and below said flange whereby water delivered to said meter chamber is channeled to flow vertically through said meter to be measured by said meter;

primary and secondary valves rotatably occupying said valve chambers, said valves having open positions for facilitating a measured flow of water through said unit and closed positions for shutting off said flow;

gravity drain means associated with said primary valve and rendered operative to drain to waste residual water occupying said meter when said primary valve is closed, said drain means being automatically shut when said primary valve is open to facilitate said measured flow of water through said unit, said metered flow of water entering said unit through said primary valve and being discharged therefrom through said secondary valve when both of said valves are in open position, said valve chambers being approximately cylindrical and said valves comprising hollow plugs rotatably fitting within said valve chambers;

said primary valve shell providing an inlet water connection and a drain to waste connection, both communicating with said primary valve chamber on approximately the same level as said primary flow passage;

said primary valve plug, when in open position, providing a passage connecting said inlet water connection with said primary flow passage, and presenting an imperforate outer surface to said drain to waste connection thereby closing the latter, said primary valve plug, when in closed position, presenting an imperforate outer surface to said inlet water connection thereby closing the latter, while providing a passage connecting said drain to waste connection with said primary flow passage whereby residual water in said meter will flow by gravity into said drain to waste connection;

spring biased check valve means mounted within said secondary hollow plug valve and functioning, while said secondary valve is turned to open position, to prevent a reverse flow of water through said secondary valve and said secondary flow passage into said meter chamber;

the primary valve passage delivering water to the housing primary flow passage, when said primary valve is open, having mounted therein a cylindrical screen through which said water is routed to collect solid particles carried by said water on the outer surface of said screen, said primary valve also having a back flushing position in which an imperforate area of said valve overlies and closes said primary flow passage and wherein a valve passage is provided connecting said water inlet connection to said drain to waste connection, water being thereby conducted under pressure in a reverse direction through said screen and back flushing to waste solid particles collected by said screen.

* * * * *